(12) United States Patent
Davis

(10) Patent No.: US 6,991,384 B1
(45) Date of Patent: Jan. 31, 2006

(54) CAMERA TRIPOD ROTATING HEAD

(76) Inventor: Robert C. Davis, 886 S. 1650 East, Springville, UT (US) 84663

(*) Notice: Subject to any disclaimer, the term of this patent is extended or adjusted under 35 U.S.C. 154(b) by 93 days.

(21) Appl. No.: 10/854,480

(22) Filed: May 27, 2004

(51) Int. Cl.
*G03B 37/00* (2006.01)

(52) U.S. Cl. .................................. 396/428; 248/187.1

(58) Field of Classification Search ................ 396/419, 396/428; 348/36; 248/349.1
See application file for complete search history.

(56) References Cited

U.S. PATENT DOCUMENTS

| | | | |
|---|---|---|---|
| 4,135,305 A | | 1/1979 | Krause |
| 4,864,335 A | * | 9/1989 | Corrales ........................ 396/24 |
| 4,905,030 A | * | 2/1990 | Corrales ....................... 396/425 |
| 5,159,368 A | | 10/1992 | Zemlin |
| 5,259,584 A | | 11/1993 | Wainwright |
| 5,752,113 A | | 5/1998 | Borden |
| 5,870,642 A | | 2/1999 | Mittelstaedt et al. |
| 2003/0128975 A1 | * | 7/2003 | Shevick ....................... 396/428 |
| 2003/0156836 A1 | | 8/2003 | Ward |

* cited by examiner

*Primary Examiner*—W. B. Perkey
(74) *Attorney, Agent, or Firm*—Gordon K. Anderson

(57) ABSTRACT

A camera tripod rotating head (20) is taught that is used for taking 360 degree photographic images with a camera (22) mounted on a tripod (24). The rotating head consists of an adapter base (26) that is configured to mate and attach to the camera tripod, and includes a one way roller clutch (30) mounted within the adapter base and a shoulder bolt (32) that is positioned through both the base and the clutch. A rotating beam (36) is attached to the adapter base with the shoulder bolt allowing the beam to revolve around the base a full 360 degrees in one direction only. Detents are position within the adapter base relative beam allowing the beam to be rotated and stopped at an equidistant predetermined location, preferably sixteen, until manually urged to the next location. An adjustable camera mounting bracket (60), configured to mate with the camera, is manually attached to the rotating beam permitting the rotating head, with a camera attached, to sweep in a one way arc of rotation stopping by the detents at each predetermined position.

18 Claims, 5 Drawing Sheets

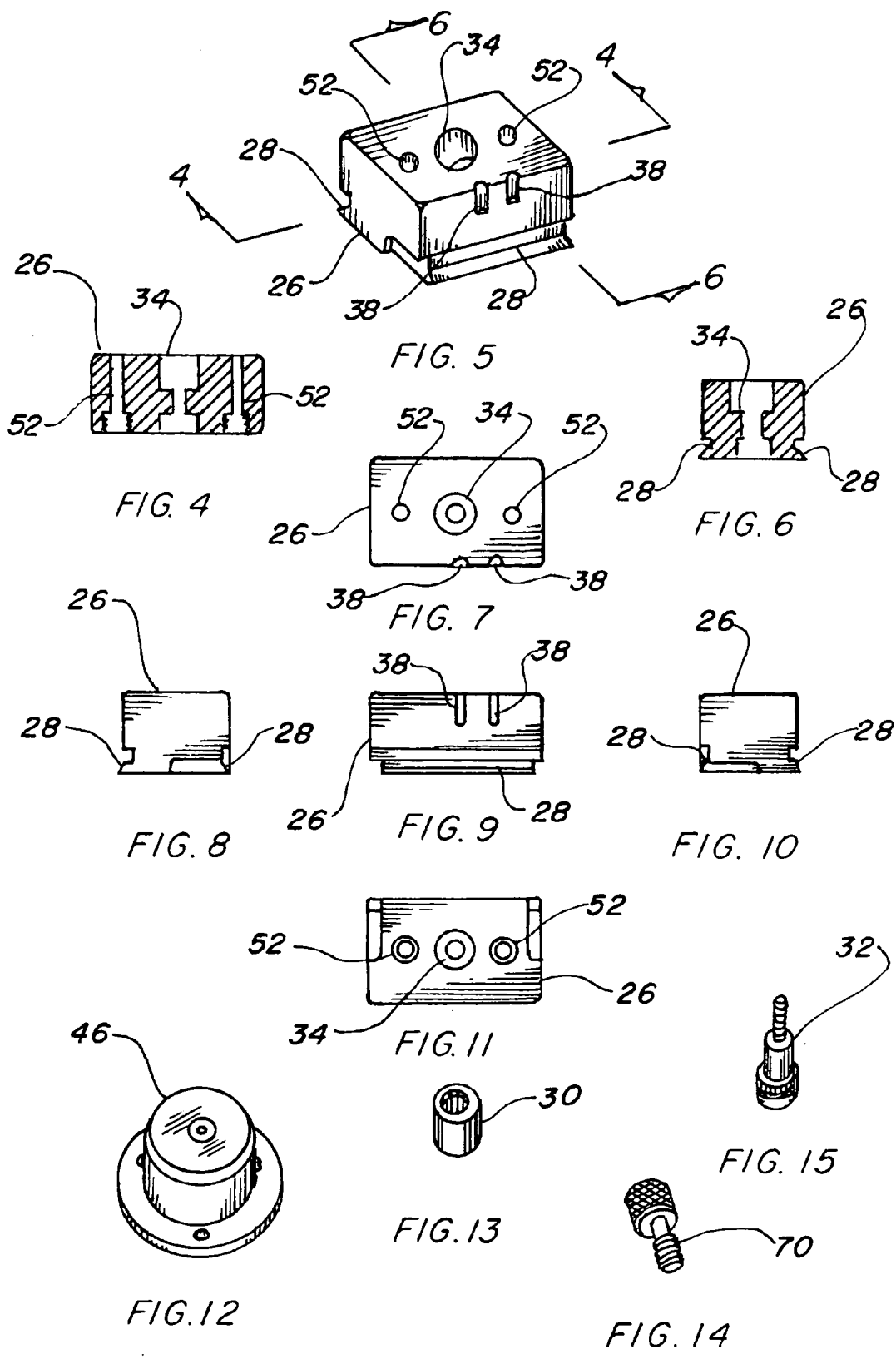

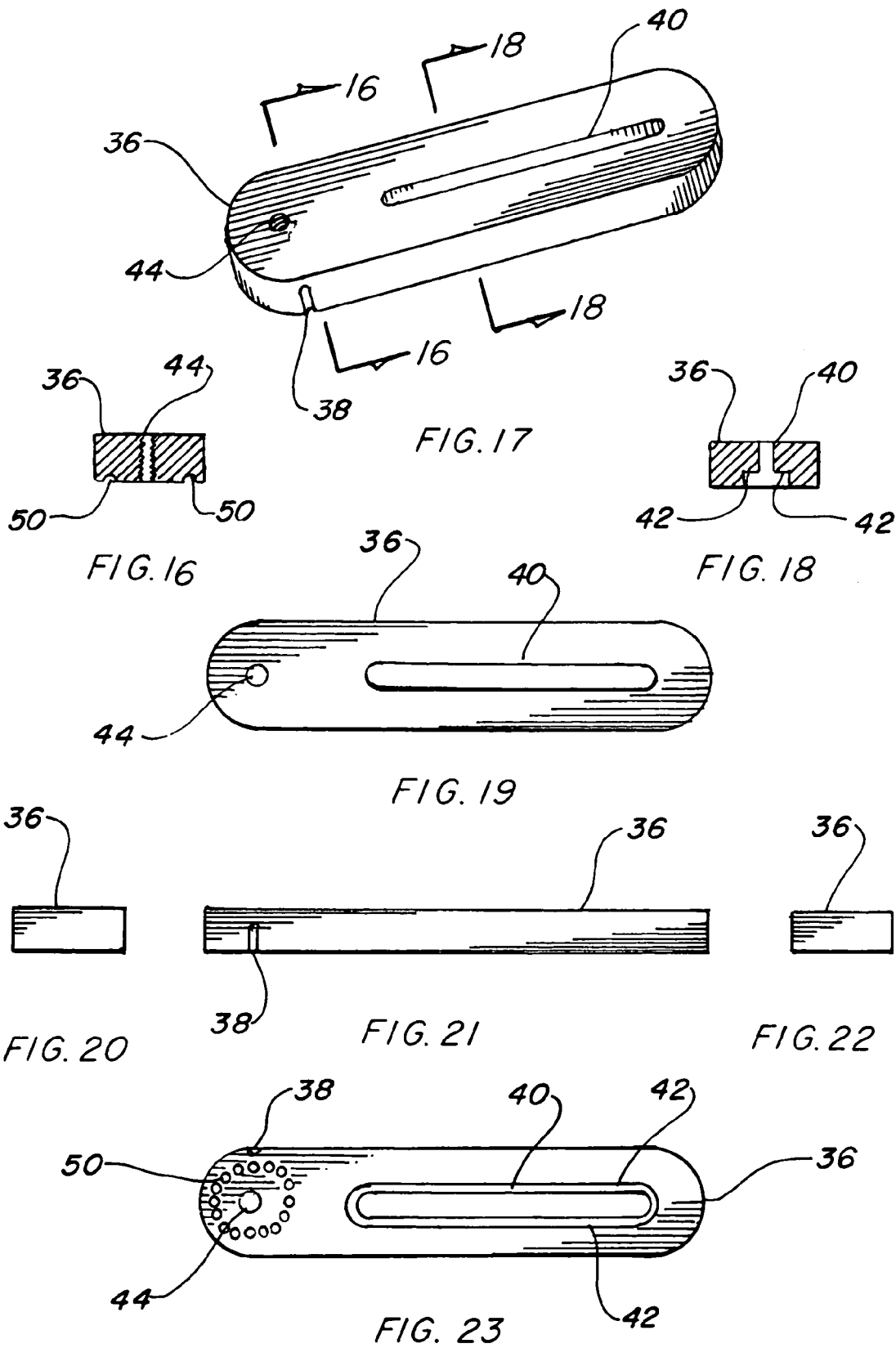

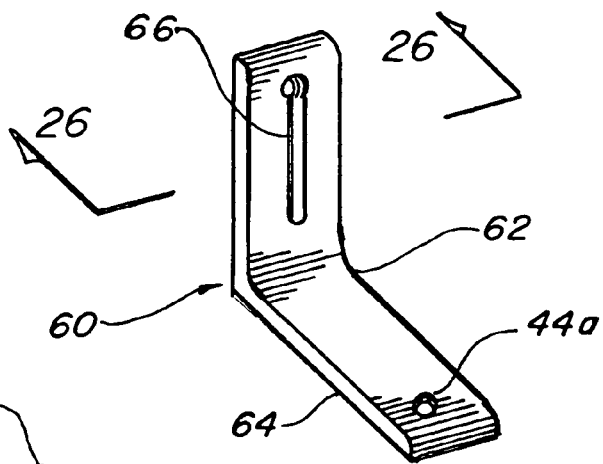
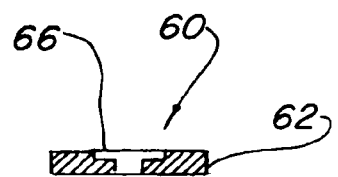
FIG. 26
FIG. 25
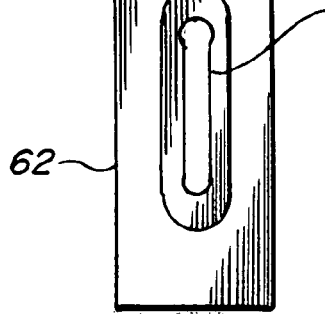
FIG. 24
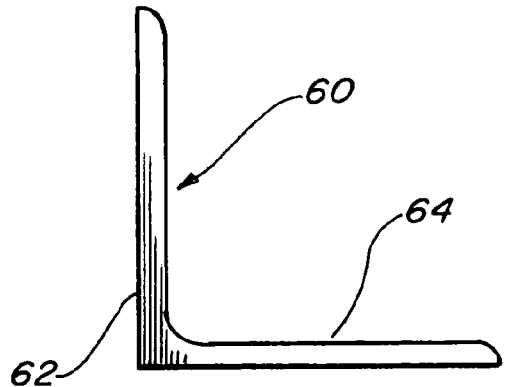
FIG. 27
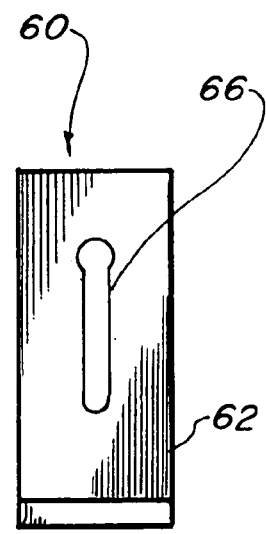
FIG. 28
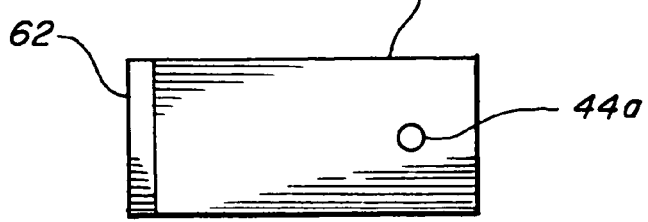
FIG. 29
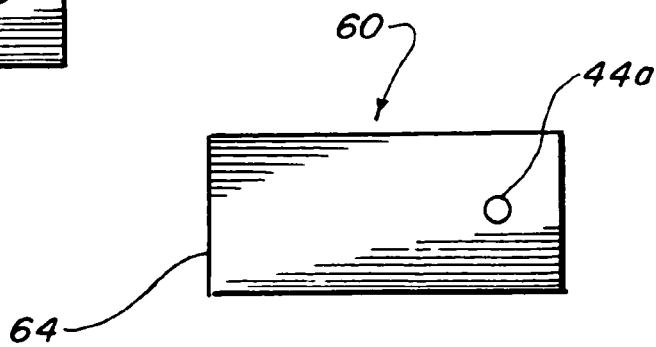
FIG. 30

CAMERA TRIPOD ROTATING HEAD

TECHNICAL FIELD

The present invention relates to rotating heads for camera tripods in general. More specifically to a camera tripod rotating head that rotates in one direction only and stops automatically at a predetermined angular displacement.

BACKGROUND ART

Previously, many types of automatic and manual panoramic camera mounts have been used in endeavoring to provide an effective means to take photographic images and pan over a range of 360 degrees. In most cases the inventions are very complex and fully automatic or require mechanical adjustments for achieving the purpose.

A search of the prior art did not disclose any patents that possess the novelty of the instant invention; however the following U.S. patents are considered related:

| U.S. Pat. No. | Inventor | Issue Date |
| --- | --- | --- |
| 4,135,305 | Krause | Jan. 23, 1979 |
| 5,159,368 | Zemlin | Oct. 27, 1992 |
| 5,259,584 | Wainwright | Nov. 09, 1993 |
| 5,752,113 | Borden | May 12, 1998 |
| 5,870,642 | Mittelstaedt et al. | Feb. 09, 1999 |
| Patent Application Publication | Inventor | Pub. Date |
| US2003/0156836 A1 | Ward | Aug. 21, 2003 |

Krause in U.S. Pat. No. 4,135,305 teaches an indexing device for maintaining the rotation of an electrode in an electric discharge machining apparatus having coarse and fine annular adjustment.

U.S. Pat. No. 5,159,368 issued to Zemlin is for a motor driven panoramic mounting for a camera. Mechanical actuators on the base act upon a turnstile on a shaft for rotating the table. The turnstile shaft rotates on two cams acting as limit switches indicating the range and when to stop the motion.

Wainwright in U.S. Pat. No. 5,259,584 discloses a camera mount for taking panoramic pictures that is attached to a tripod permitting the camera to sweep in an arc of rotation along the top of the tripod. A stationary detent is attached to a protractor with adjustable detents disposed on each side. A bubble level facilitates leveling of the invention and an optical encoder converts angular displacement into a digital readout.

Borden in U.S. Pat. No. 5,752,113 teaches a mount that rotates a camera such that the images may be electronically switched together. A base is held on a tripod and a frame attaches a chemical-film or digital camera. The invention has a rotational advance system enabling the rotation thorough discrete angles through 360 degrees. High speed systems using controllers coordinate the rotation resulting in a panorama photographed in less than one second.

U.S. Pat. No. 5,870,642 issued to Mittelstaedt et al. presents a panoramic support for a camera rotating at the same angle between successive images. The invention includes an indexing head rotating or indexing in a horizontal or vertical orientation. Angle indicators are included for rotating the camera between each image and another angle between each vertical-format image.

Ward in U.S. Patent Application Publication U.S. 2003/0156836 A1 discloses a camera support which clamps on a square, rectangular or round shaft. The camera is fastened to a rotatable support plate by a thumbscrew using compressive tension of the clamping mechanism.

DISCLOSURE OF THE INVENTION

The invention is used to take 360 degree photographic images with a camera mounted on a tripod. A rotating head is attached to the tripod in a conventional manner utilizing a dovetail groove or the like. The rotating head incorporates a detent system that positions the head at 16 equidistant intervals of 22.5 degree increments allowing photographic images to be taken at each position. The 16 photographic images are then butted together at the intersecting edges to form a complete 360 degree picture of the surroundings. The completed picture enables a view of the surroundings as if you were standing in one place and turning around.

It is therefore the primary object of the invention to furnish digital photographic images that may be assembled into a 360 degree panorama utilizing the camera tripod rotating head to take the initial photographs. The utility of the final objective of the invention is best realized in the real estate industry where a listing may be photographed outside and also inside of each room with a brochure made of the complete structure. Therefore with the advent of electronic digital cameras and the almost universal use of personal computers the listings in a brochure format may be viewed and downloaded on the internet without the intervention of the realtor.

An important object of the invention is that the internet utilized to communicate with potential buyers has the ability to see what the property actually looks like inside and out without physically visiting the site themselves. The invention of the rotating head permits this utility achieving one step in the overall production sequence.

Another object of the invention is that the camera tripod rotating head is very simple to use as there are no dials, switches, vernier gauges or angular indexing indicators required. The camera is basically attached to the mounting bracket of the rotating head with a knurled thumb screw and rotated by hand until it automatically stops at the predetermined position where it is held rigidly by the detents. When the photograph is taken the camera is then manually rotated to the next position overcoming the spring pressure of the detents and the procedure is repeated.

Still another object is that the invention may be used with either chemical-film or digital cameras. While the invention was developed specifically for digital cameras, the chemical-film type camera may also be used with the panoramic composition formulated applying conventional reproduction processes.

A further object of the invention is that the camera tripod rotating head is relatively inexpensive to fabricate as it is made of standard traditional materials using conventional fabrication processes. Further since the invention is completely mechanical in nature and no adjustments or settings are required and expensive controls are completely unnecessary.

Yet another object of the invention a simple bubble level is attached to the top of the head to assure that the photos align properly when the camera is rotated. This level is easy to use and adjustments in the tripod legs are easily made to assure the tripod mounting table is flat and level.

A final object of the invention is that the camera may be rotated in one direction only as the movement is controlled by a roller clutch. Cam type rollers are positioned within an outer sleeve which is held tightly in the adapter base and a shoulder bolt connecting the rotating beam is located within the clutch. When the camera is rotated in one direction the rollers act as a bearing and permit free movement and when reversed the rollers twist and lock onto the bolt preventing rotation. This system is completely automatic as no effort is required by the user therefore the photographs cannot be inadvertently repeated.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a cross sectional view taken along lines 4—4 of FIG. 5.

FIG. 5 is a partial isometric view of the tripod mounting adapter base completely removed from the invention for clarity.

FIG. 6 is a cross sectional view taken along lines 6—6 of FIG. 5.

FIG. 7 is a top view of the tripod mounting adapter base.

FIG. 8 is a left side view of the tripod mounting adapter base.

FIG. 9 is a front view of the tripod mounting adapter base.

FIG. 10 is a right view of the tripod mounting adapter base.

FIG. 11 is a bottom view of the tripod mounting adapter base.

FIG. 12 is a partial isometric view of the surface mounted circular level completely removed from the invention for clarity.

FIG. 13 is a partial isometric view of the one way roller clutch completely removed from the invention for clarity.

FIG. 14 is a partial isometric view of the knurled thumb screw completely removed from the invention for clarity.

FIG. 15 is a partial isometric view of the shoulder bolt completely removed from the invention for clarity.

FIG. 16 is a cross sectional view taken along lines 16—16 of FIG. 17.

FIG. 17 is a partial isometric view of the rotating beam completely removed from the invention for clarity.

FIG. 18 is a cross sectional view taken along lines 18—18 of FIG. 17.

FIG. 19 is a top view of the rotating beam.

FIG. 20 is a left side view of the rotating beam.

FIG. 21 is a front view of the rotating beam.

FIG. 22 is a right side view of the rotating beam.

FIG. 23 is a bottom view of the rotating beam.

FIG. 24 is a rear view of the adjustable camera mounting bracket.

FIG. 25 is a partial isometric view of the adjustable camera mounting bracket.

FIG. 26 is a cross sectional view taken along lines 26—26 of FIG. 25.

FIG. 27 is a side view of the adjustable camera mounting bracket.

FIG. 28 is a front view of the adjustable camera mounting bracket.

FIG. 29 is a top view of the adjustable camera mounting bracket.

FIG. 30 is a bottom view of the adjustable camera mounting bracket.

BEST MODE FOR CARRYING OUT THE INVENTION

Figure 1:
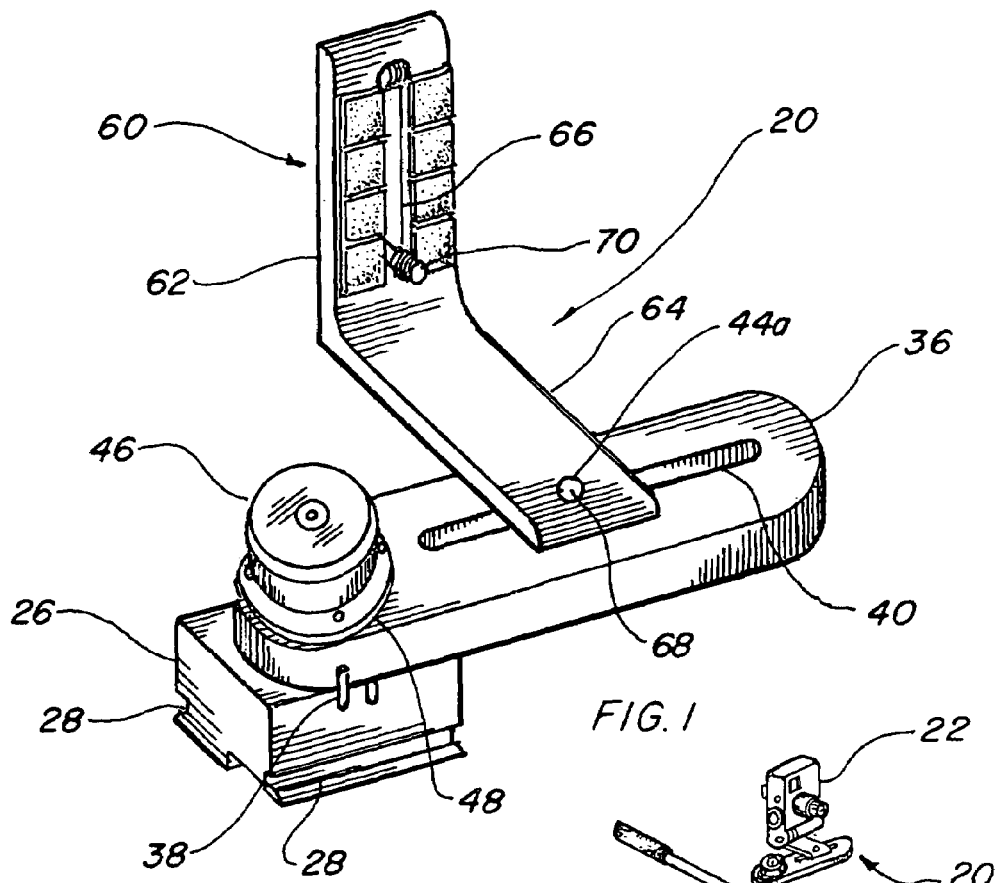
FIG. 1 is a partial isometric view of the preferred embodiment of the camera tripod rotating head.
Figure 2:
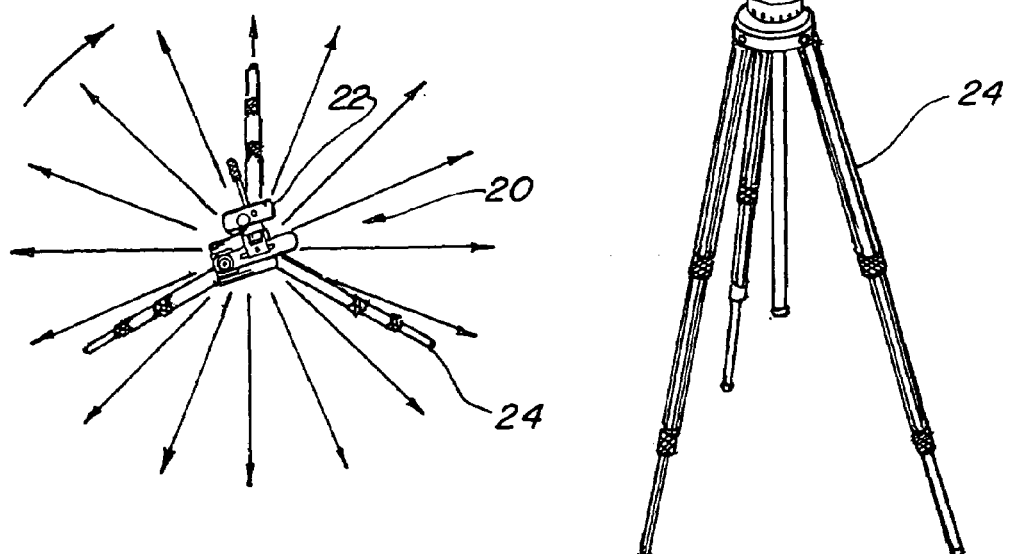
FIG. 2 is a top view of a camera mounted on the preferred embodiment which is in turn attached to a tripod illustrating the sixteen intervals of 22.5 degrees where the rotating head stops.
Figure 3:
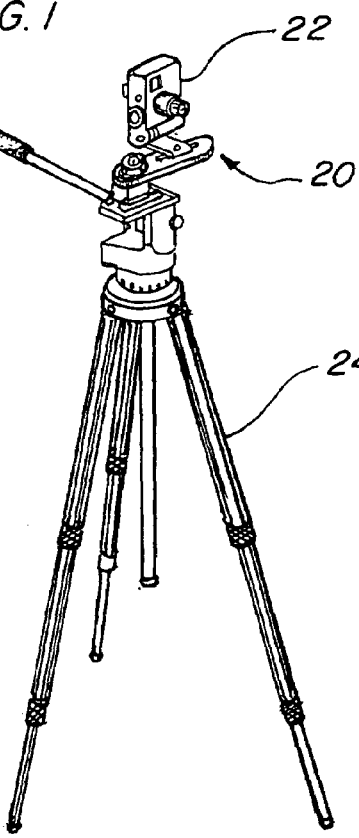
FIG. 3 is a partial isometric view of a camera mounted on the preferred embodiment which is in turn attached to a tripod.

The best mode for carrying out the invention is presented in terms of a preferred embodiment. This preferred embodiment is shown in FIGS. 1 thorough 31 and is comprised of camera tripod rotating head 20 for taking 360 degree photographic images with a camera 22 mounted on a tripod 24. While the camera 22 and tripod 24 are not part of the invention the rotating head 20 permits the camera 22 to achieve the desired functional operation when mounted on the tripod 24.

A tripod mounting adapter base 26, shown in FIGS. 5–11, is configured to mate and attach to a conventional camera tripod 24 having a dovetail groove. This attachment method is well known and a relative standard in the industry and therefore the rotating head 20 may be securely attached to the tripod 24 assuring a solid and repeatable junction therebetween.

The tripod mounting adapter includes a one way roller clutch 30 that is mounted within the approximate center of the adapter base 26 with a shoulder bolt 32 positioned through the clutch 30 with the head of the bolt 32 fitting into a counter bore 34 within the base 26, as shown in the cross section of FIGS. 4 and 6. The one way roller clutch 30, illustrated by itself in FIG. 13, in its preferred embodiment consists of a plurality of cam rollers that are circularly disposed within a housing sleeve such that when said shoulder bolt 32 engages the cam rollers the bolt 32 is permitted to rotate in one direction only and when it is reversed the cams rotate slightly and tightly grip the shoulder of the bolt 30 preventing rotation in an opposite direction.

A rotating beam 36, shown in FIGS. 17–23, is attached to the adapter base 26 with the shoulder bolt 32 allowing the beam 36 to revolve around the adapter base 26 a full 360 degrees, however, in one direction only. The adapter base 26 and the rotating beam 36 both include alignment grooves 38 therein providing an indexing indication for starting and stopping the rotation of the beam 36 when sequential photographic images are taken by the camera 22. The adapter base 26 preferably includes two alignment grooves 38 as shown in FIGS. 5, 7 and 9 while the rotating beam 36 preferably has a single groove 38, as illustrated in FIGS. 17 and 21.

The rotating beam 36 contains a bracket mounting slot 40 therethrough with a recessed shoulder 42 on the underside of the beam 36 as illustrated best in FIG. 18. A threaded hole 44 is located through the beam 36 that is positioned to interface with the shoulder bolt 32 which attaches the beam 36 to the adapter base 26 permitting the beam 36 to rotate freely in one direction only. The shoulder bolt 32 is sized to allow a gap to exist between the base 26 and the beam 36 therefore permitting rotation to be easily accomplished.

Figure 31:
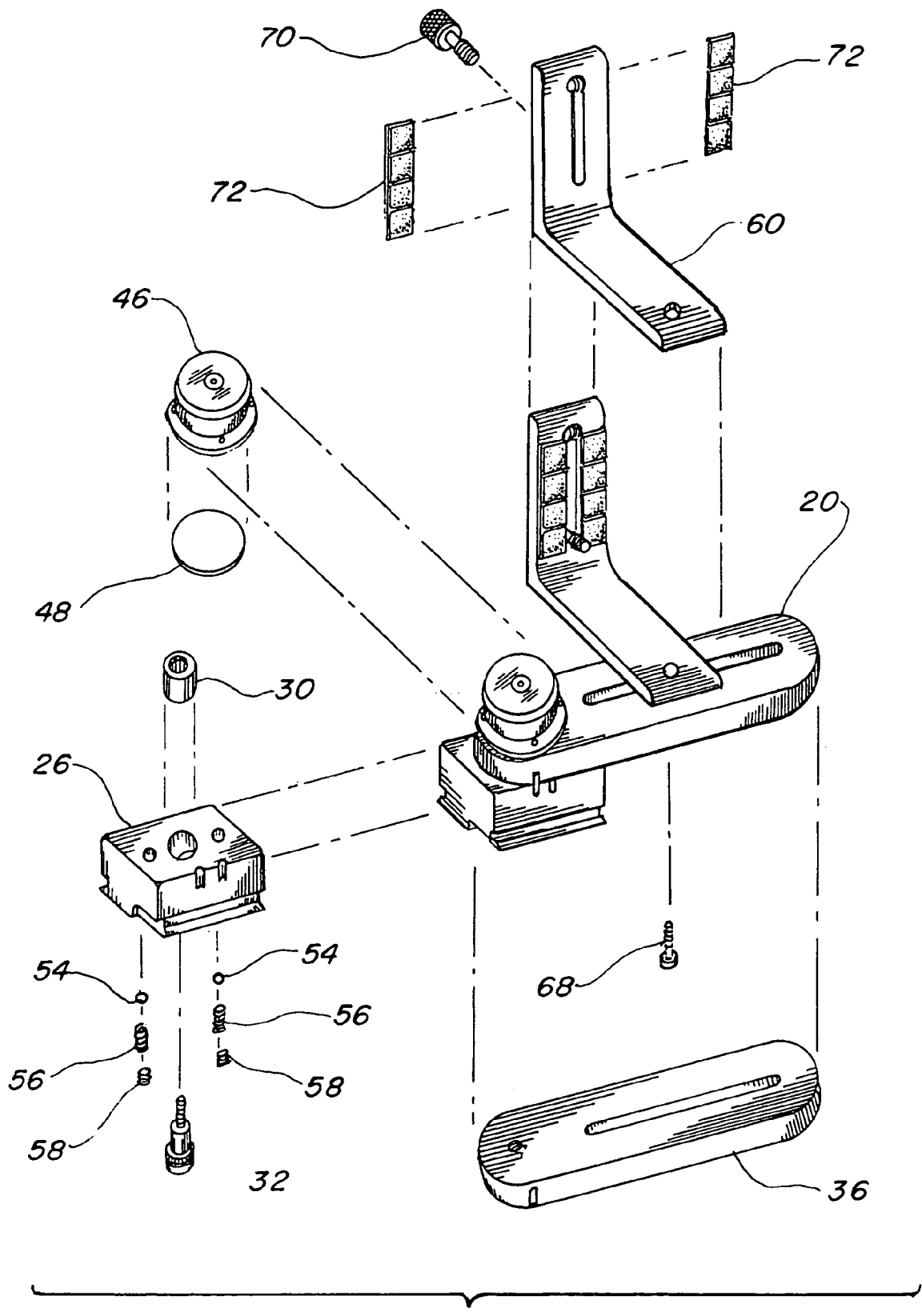
FIG. 31 is an exploded isometric view of the preferred embodiment entirely removed from the invention for clarity.

A surface mounted circular level 46 is attached to the rotating beam 36 at a position above the intersection with the adapter base 26, as shown in FIGS. 1 and 31, for positioning the tripod 24, on which the rotating head 20 is attached, to assure proper leveling of the head 20 for photographic purposes. The surface mounted circular level 46 is attached to the rotating beam 36 preferably with double sided pressure sensitive adhesive tape 48, however any other method of attachment may be used with equal ease and dispatch.

Detent means are provided for rotatably positioning the adapter base 26 relative to the rotating beam 36 in a predetermined location to accomplish the desired 360 degree sweep in an arc of rotation stopping at a series of predetermined positions allowing photographic images to be taken at each position. The detent means are defined as follows; the rotating beam 36 includes a plurality of radial cavities 50 that are situated in a circle radially disposed around the threaded hole 44 with the adapter base 26 including at least one hole 52, preferably two, therethrough with a steel ball 54, or the like, urged by a compression spring 56 held in place with a set screw 58 positioned within each hole 52. The balls 54 align with the radial cavities 50 such that when the rotating beam 36 is revolved around the shoulder bolt 32 the balls 54 penetrate the radial cavities (50) holding the beam 36 in place until manual pressure is exerted, retracting the spring loaded balls 54 and moving the beam 36 to the next aligned cavities (50). The gap between the beam 36 and adapter base 26 allowed by the shoulder bolt 32 is sufficient to permit rotation without binding.

The radial cavities 50 in the rotating beam 36 are positioned in the circle preferably 22.5 degrees apart making 16 discrete cavities 50 in the 360 degree rotation. It should be noted however, that any number of equal positions may be utilized to accomplish the same purpose and the invention is not limited to the specific number that have been described.

An adjustable camera mounting bracket 60 is manually attached to the rotating beam 36 to mate with a camera 22 and is adjustable to fit most conventional cameras and allow them to be located in the proper positional manner to accomplish the task at hand. The camera mounting bracket 60 has an angular shape formed with a vertical leg 62 and a horizontal leg 64. The vertical leg 62 has a camera mounting slot 66 and a threaded hole 44a is provided in the horizontal leg 64.

An attaching screw 68 connects through the bracket mounting slot 40 in the beam 36 into the bracket threaded hole 44a joining the bracket 60 to the beam 36 in an adjustable manner, as illustrated in FIGS. 1 and 31. A knurled thumb screw 70 is captivated within the camera mounting slot 66 for mounting a camera 22 onto the vertical leg 62. A resilient thermoplastic cushion 72 may optionally be connected to the mounting bracket 60 utilizing pressure sensitive backing which resiliently protects a camera 22 when it fastened to the bracket 60 with the knurled thumb screw 70.

The camera tripod rotating head's major components, which include the adapter base 26, rotating beam 36 and camera mounting bracket 60 are preferably made of a metallic material with aluminum being the most favorable. This aluminum or other material may be anodized, plated, painted or any other type of finish to prevent corrosion and add to its aesthetic appearance.

In function, a camera 22 is attached to the rotating head 20 which is positioned on a tripod 24 which is then manually adjusted with the circular level 46 on the head. The camera 22 is then rotated manually to sweep in an arc of rotation stopping by the detent means at the series of predetermined positions. A photographic image is taken at each position enabling individual images to be subsequently aligned together into a completed picture viewing surroundings as if a person were standing in one place and turning completely around.

While almost any camera may be used with the invention, including chemical film cameras, it has been found however that a digital camera having at least a definition of 2 megapixels is preferred. With this type of camera the image alignment is simple and the composition of the images may be easily transmitted and viewed on a computer and therefore transmitted on the internet. As previously stated the utility of the invention is best realized in the real estate industry where a listing may be digitally photographed and a brochure may be made of the complete structure then viewed and downloaded on the internet.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A camera tripod rotating head for taking 360 degree photographic images with a camera mounted on a tripod, comprising, a tripod mounting adapter base configured to mate and attach said base to a camera tripod in a secure manner, wherein said tripod mounting adapter further having a one way roller clutch mounted within the adapter base with a shoulder bolt positioned through said adapter base, a rotating beam attached to said adapter base with said shoulder bolt such that the beam may revolve around the adapter base a full 360 degrees in one direction only, detent means for rotatably positioning the adapter base relative to the rotating beam in predetermined locations, and an adjustable camera mounting bracket manually attached to said rotating beam with said mounting bracket configured to mate with a camera in an positional manner, permitting the rotating head, with a camera attached, to sweep in a arc of rotation stopping by detent means at a series of predetermined positions allowing a photographic image to be taken at each position, enabling individual images to be aligned together into a completed picture viewing surroundings as if a person were standing in one place and turning completely around.

2. The camera tripod rotating head as recited in claim 1 further comprising, said adapter base, rotating beam and camera mounting bracket fabricated of a metallic material.

3. The camera tripod rotating head as recited in claim 2 wherein said metallic material comprises aluminum.

4. The camera tripod rotating head as recited in claim 3 wherein said aluminum material further comprises an anodized finish.

5. The camera tripod rotating head as recited in claim 1 wherein said tripod adapter mounting base further having a dovetail groove therein configured to mate with conventional camera tripods such the rotating head may be securely attached to a tripod assuring a solid and repeatable junction therebetween.

6. The camera tripod rotating head as recited in claim 1 wherein said one way roller clutch further comprising a plurality of cam rollers circularly disposed in a housing sleeve such that when said shoulder bolt engages the cam rollers the bolt is permitted to rotate in one direction and when reversed the cams rotate slightly and tightly grip the shoulder of the bolt preventing rotation in an opposite direction.

7. The camera tripod rotating head as recited in claim 1 wherein said adapter base and said rotating beam each further having alignment grooves therein that provide indexing indication for starting and stopping the rotation of the beam when sequential photographic images are taken.

8. The camera tripod rotating head as recited in claim 1 further comprising a surface mounted circular level attached to said rotating beam at a position above an intersection with said adapter base, for positioning a tripod, on which the rotating head may be attached, to assure proper leveling of the head for photographic alignment purposes.

9. The camera tripod rotating head as recited in claim 8 wherein said surface mounted circular level is attached to the rotating beam with double sided pressure sensitive adhesive tape.

10. The camera tripod rotating head as recited in claim 1 wherein said detent means further comprises, said rotating beam having a plurality of radial cavities positioned in a circle and said adapter base having at least one hole therethrough with a steel ball urged by a compression spring held in place with a set screw positioned within each hole which align with said cavities such that when the rotating beam is revolved around the shoulder bolt at least one ball penetrates a cavity in the rotating beam holding the beam in place until manual pressure is exerted retracting the ball and moving the beam to the next aligned cavity.

11. The camera tripod rotating head as recited in claim 1 wherein said rotating beam cavities positioned in a circle further comprises, 16 discrete cavities positioned at 22.5 degrees apart.

12. The camera tripod rotating head as recited in claim 1 wherein said adjustable camera mounting bracket further having an angular shape, which includes a vertical leg and a horizontal leg, said vertical leg having a camera mounting slot therein and said horizontal leg having a threaded hole therein.

13. The camera tripod rotating head as recited in claim 12 further comprising said rotating beam having a bracket mounting slot therein, an attaching screw connecting through said rotating beam bracket mounting slot interfacing with said bracket threaded hole in said camera mounting bracket horizontal leg, for joining the bracket to the beam in an adjustable manner.

14. The camera tripod rotating head as recited in claim 12 further comprising a knurled thumb screw captivated within said camera mounting slot for attaching a camera onto the camera mounting bracket vertical leg.

15. The camera tripod rotating head as recited in claim 1 wherein said adjustable camera mounting bracket further comprises a resilient thermoplastic cushion connected to said mounting bracket with pressure sensitive backing for resiliently protecting a camera when fastened to the bracket.

16. A camera tripod rotating head for taking 360 degree photographic images with a camera mounted on a tripod, comprising,
   a tripod mounting adapter base,
   a rotating beam attached to said tripod mounting adapter base permitting the beam to revolve around the adapter base 360 degrees in one direction only, positioning the adapter base relative to the rotating beam at predetermined locations, and
   an adjustable camera mounting bracket attached to said rotating beam permitting the rotating head, with a camera attached, to sweep in a arc of rotation stopping at a series of predetermined positions allowing a photographic image to be taken at each position enabling individual images to be aligned together into a completed picture viewing surroundings as if a person were standing in one place and turning completely around.

17. A camera tripod rotating head for taking 360 degree photographic images with a camera mounted on a tripod, comprising,
   a rotating beam attached to a tripod mounting adapter base having means to rotate the beam to a plurality of positions around 360 degrees in one direction from the base, and
   an adjustable camera mounting bracket attached to the beam permitting the rotating head, with a camera attached, to sweep in an arc of rotation stopping at a series of predetermined positions allowing a photographic image to be taken at each position enabling individual images to be aligned together into a completed picture viewing a complete 360 degree surrounding.

18. The camera tripod rotating head as recited in claim 17 wherein said beam stops at 16 predetermined locations positioned at 22.5 degrees apart.

* * * * *